US012394889B2

(12) United States Patent
Igarashi et al.

(10) Patent No.: US 12,394,889 B2
(45) Date of Patent: Aug. 19, 2025

(54) WAVE CONTROL MEDIUM, WAVE CONTROL ELEMENT, WAVE CONTROL MEMBER, WAVE CONTROL DEVICE, AND MANUFACTURING METHOD OF WAVE CONTROL MEDIUM

(71) Applicant: Sony Group Corporation, Tokyo (JP)

(72) Inventors: Eri Igarashi, Tokyo (JP); Takashi Kawamura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 240 days.

(21) Appl. No.: 18/038,148

(22) PCT Filed: Oct. 13, 2021

(86) PCT No.: PCT/JP2021/037892
§ 371 (c)(1),
(2) Date: May 22, 2023

(87) PCT Pub. No.: WO2022/113551
PCT Pub. Date: Jun. 2, 2022

(65) Prior Publication Data
US 2024/0006749 A1    Jan. 4, 2024

(30) Foreign Application Priority Data
Nov. 27, 2020  (JP) ................. 2020-196694

(51) Int. Cl.
*H01Q 15/00*    (2006.01)
*H01P 7/00*    (2006.01)
(Continued)

(52) U.S. Cl.
CPC ............. *H01Q 1/38* (2013.01); *H01P 7/005* (2013.01); *H01Q 1/362* (2013.01); *H01Q 15/141* (2013.01)

(58) Field of Classification Search
CPC ........ H01Q 1/38; H01Q 1/362; H01Q 15/141; H01Q 1/364; H01Q 15/10; H01Q 17/002; H01Q 15/0086; H01P 7/005; G02B 1/002
See application file for complete search history.

(56) References Cited

U.S. PATENT DOCUMENTS

| 2005/0008308 A1* | 1/2005 | Bita ............... B82Y 20/00 385/123 |
| 2011/0175795 A1* | 7/2011 | Toujo ............. G02B 1/007 343/909 |

FOREIGN PATENT DOCUMENTS

| CN | 105137520 A | 12/2015 |
| CN | 106163247 A | 11/2016 |

(Continued)

OTHER PUBLICATIONS

International Search Report from corresponding PCT application PCT/JP2021/037892, dated Dec. 7, 2021.
He Zidong et al., "Ultrawide bandwidth and large-angle electromagnetic wave absorption based on triple-nested helix metamaterial absorbers", Journal of Applied Physics, American Institute of Physics, 2 Huntington Quadrangle, Melville, NY 11747, vol. 127, No. 17, May 6, 2020.

(Continued)

*Primary Examiner* — David E Lotter
(74) *Attorney, Agent, or Firm* — K&L Gates LLP

(57) ABSTRACT

To provide a wave control medium that can absorb and control wave motion while achieving downsizing and wider bandwidth of a metamaterial and the like.
A wave control medium 5 includes a three-dimensional microstructure having a base 2, a spiral part 3, and a matching element 6 disposed between the base 2 and the spiral part 3, in which the three-dimensional microstructure includes a material selected from any one of a metal, a dielectric, a magnetic body, a semiconductor, and a superconductor, or a combination of a plurality of these materials. The wave control medium 5 can absorb the wave motion by (Continued)

having the matching element 6 disposed between the base 2 and the spiral part 3 to moderate a change in the entire impedance value.

15 Claims, 16 Drawing Sheets

(51) Int. Cl.
  *H01Q 1/36* (2006.01)
  *H01Q 1/38* (2006.01)
  *H01Q 15/14* (2006.01)

(56) References Cited

FOREIGN PATENT DOCUMENTS

| JP | 2011097334 A | 5/2011 |
|---|---|---|
| KR | 20180054105 A | 5/2018 |
| WO | 2010026907 A | 3/2010 |

OTHER PUBLICATIONS

Soumitra Mokashi-Punekar et al., "Construction of Chiral, Helical Nanoparticle Superstructures: Progress Prospects", Advanced Materials, VCH Publishers, DE, vol. 32, No. 41, Dec. 9, 2019.
Zhenyu Yang et al, "A novel helical metamaterial absorber: Simulation study with the FDTD method", Metamaterials (META), 2012 International Workshop On, IEEE, Oct. 8, 2012, pp. 1-3.

\* cited by examiner

WAVE CONTROL MEDIUM, WAVE CONTROL ELEMENT, WAVE CONTROL MEMBER, WAVE CONTROL DEVICE, AND MANUFACTURING METHOD OF WAVE CONTROL MEDIUM

TECHNICAL FIELD

The present technology relates to a technique using a wave control medium and the like, and more specifically, to a technique of controlling wave motion using an artificial structure.

BACKGROUND ART

Conventionally, it has been proposed to use a metamaterial having characteristics such as a negative refractive index for reflection, shielding, absorption, phase modulation, and the like of various waves including radio waves, light waves, and sound waves. Here, the metamaterial refers to an artificial structure that generates a function that cannot be exhibited by a substance that exists in nature. The metamaterial is produced by, for example, aligning unit microstructures such as metals, dielectrics, magnetic bodies, semiconductors, and superconductors at sufficiently short intervals with respect to a wavelength to exhibit properties that do not exist in nature. The metamaterial thus produced can control wave motion of electromagnetic waves or the like by controlling the permittivity and the permeability.

A wave control medium, which is a unit structure of the metamaterial, usually has a size of about 1/10 of a wavelength, and exerts the function by being formed into an array structure of about several units. When a wave having a long wavelength such as a microwave or a sound wave in an audible range is used, a metamaterial structure is also enlarged according to the wavelength, and a large footprint is required. This causes a problem when such wave motion is used in a small electronic device.

As a solution of downsizing, for example, Patent Document 1 proposes a metamaterial including: a plurality of first resonators each of which generates a negative permittivity with respect to a predetermined wavelength, each of the plurality of first resonators including an internal space; a plurality of second resonators each of which generates a negative permeability with respect to the predetermined wavelength; and a support member that fixes positions of the first resonators and the second resonators, in which the support member fixes each of the second resonators inside the plurality of first resonators and fixes the plurality of first resonators such that the plurality of first resonators is spatially continuous.

Here, because the operation principle of the metamaterial is based on a resonance phenomenon due to interaction between a wave motion and a structure, a response intensity of the metamaterial sharply decreases at frequencies other than the resonance frequency, and a response is obtained in a narrowband frequency range. This causes a problem in a case where a broadband frequency is used at the same time. However, the technique of Patent Document 1 does not propose a solution for the metamaterial to achieve downsizing and widening of the bandwidth at the same time and putting the metamaterial into practical use.

Meanwhile, as a solution to downsizing and widening of the bandwidth, for example, Non-Patent Document 1 discloses a metamaterial having a structure in which a three-dimensional spiral part is disposed on a base of a two-dimensional square lattice.

CITATION LIST

Patent Document

Patent Document 1: International Publication No. WO 2010/026907

Non-Patent Document

Non-Patent Document 1: SCIENCE 18 Sep. 2009: Vol. 325, Issue 5947, pp. 1513-1515, "Gold Helix Photonic Metamaterial as Broadband Circular Polarizer", Justyna K. Gansel, Michael Thiel, Michael S. Rill, Manuel Decker, Klaus Bade, Volker Saile, Georg von Freymann, Stefan Linden and Martin Wegener

SUMMARY OF THE INVENTION

Problems to be Solved by the Invention

However, in the technique of Non-Patent Document 1, because impedance values of the base and the spiral part are greatly different from each other, due to impedance mismatch between the base and the spiral part, a wave of an incident electromagnetic wave or the like is reflected at a matching portion between the base and the spiral part, and the wave motion cannot be absorbed. Therefore, the technique of Non-Patent Document 1 cannot be used for a member or the like that absorbs and controls the wave motion.

Accordingly, a main object of the present technology is to provide a wave control medium that can absorb and control wave motion while achieving downsizing and wider bandwidth of a metamaterial and the like.

Solution to Problems

In the present technology, there is provided a wave control medium including a three-dimensional microstructure having a base, a spiral part, and a matching element disposed between the base and the spiral part, in which the three-dimensional microstructure includes a material selected from any one of a metal, a dielectric, a magnetic body, a semiconductor, and a superconductor, or a combination of a plurality of these materials.

Furthermore, the spiral part may have a multilayer structure. The spiral part may have a cone shape. At least two of the three-dimensional microstructures may be provided. The at least two of the three-dimensional microstructures may have a continuous structure in which the structures are intertwined while facing each other without being in contact with each other. At least one of the three-dimensional microstructures may have any one of a wire shape, a plate shape, and a sphere shape.

Furthermore, the present technology provides a wave control element in which a plurality of the above wave control media is integrated in an array structure or dispersedly disposed. Furthermore, it is also possible to provide a wave control element including the above wave control medium, the wave control element having a specific bandwidth of a response of 30% or more, and an absorption intensity in the specific bandwidth of 50% or more. In addition, the present technology provides a wave control member including the above wave control medium.

Furthermore, the present technology provides a metamaterial including the above wave control medium and a wave control device including the metamaterial. Furthermore, the present technology provides a wave control device including an electromagnetic wave absorbing and/or blocking member having the above wave control medium and the above metamaterial. Furthermore, the present technology provides a wave control device including a sensor having the above wave control medium or the above electromagnetic wave absorbing and/or blocking member. In addition, the present technology provides a wave control device that performs signal transmission/reception or light reception/emission using the above wave control medium.

Moreover, the present technology provides a manufacturing method of a wave control medium, the manufacturing method including forming a microstructure into a three-dimensional structure using a molecular template that utilizes self-assembly of an organic substance, the microstructure including a material selected from any one of a metal, a dielectric, a magnetic body, a semiconductor, and a superconductor, or a combination of a plurality of these materials.

Effects of the Invention

According to the present technology, it is possible to provide a wave control medium that can absorb and control wave motion while achieving downsizing and wider bandwidth of a metamaterial and the like. Note that the above effects are not necessarily limited, and any of the effects described in the present description or other effects that can be grasped from the present description may be exhibited together with the above effects or instead of the above effects.

MODE FOR CARRYING OUT THE INVENTION

Figure 1:
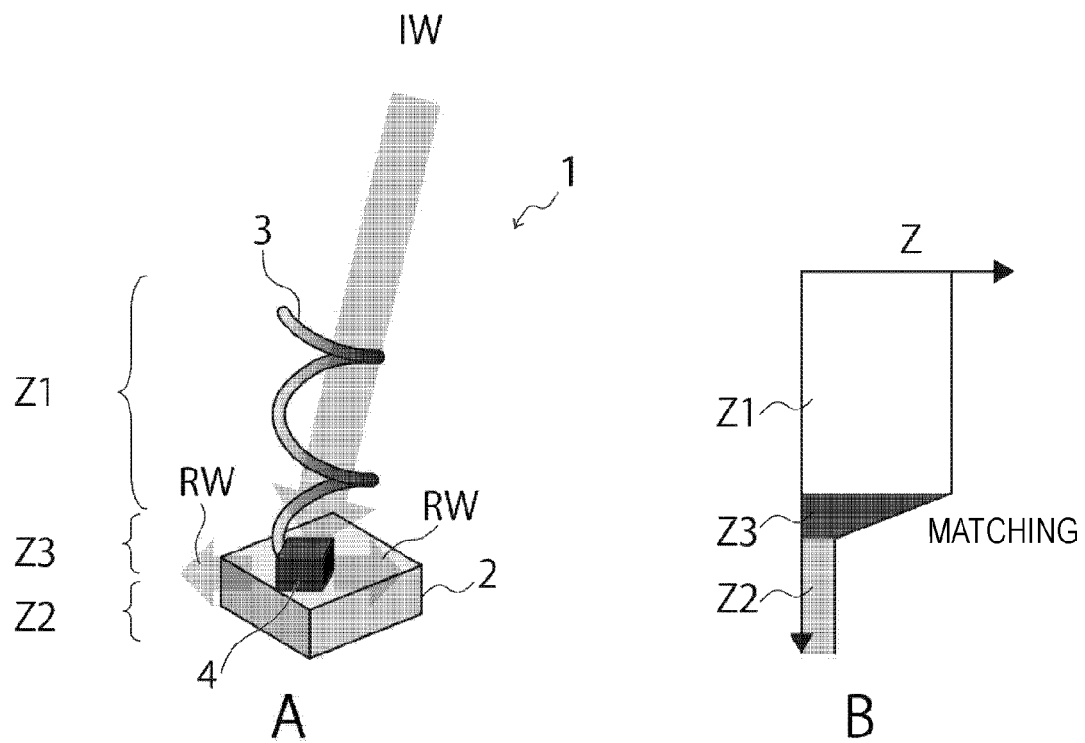
FIG. 1 is a perspective view showing a configuration example of a wave control medium according to a first embodiment of the present technology.

Hereinafter, preferred embodiments for carrying out the present technology are described with reference to the drawings. The embodiments described below each show an example of the representative embodiment of the present technology, and any of the embodiments can be combined with each other. Furthermore, the scope of the present technology is not narrowly interpreted by these. Note that the description is given in the following order.

1. First embodiment (Single-turn coil type 1)
    (1) Overview of metamaterial
    (2) Configuration example of wave control medium 1
2. Second embodiment (Single-turn coil type 2)
3. Third embodiment (Multiple coil type 1)
4. Fourth embodiment (Multiple coil type 2)
    (1) Configuration example of wave control medium 10
    (2) Example of manufacturing method of wave control medium 10

Fifth embodiment (Coaxial cable type)
6. Sixth embodiment (Double gyroid type)
7. Seventh embodiment (Cone type)
8. Eighth embodiment (Combination with wire structure)
    (1) Combination of a plurality of structures
    (2) Configuration example of wave control medium 50
    (3) Modified example 1 of wave control medium 50
    (4) Modified example 2 of wave control medium 50
9. Ninth embodiment (Combination with plate structure)
    (1) Configuration example of wave control medium 80
    (2) Modified example of wave control medium 80
10. Tenth embodiment (Combination with sphere structure)
11. Eleventh embodiment (Electromagnetic wave absorbing member)
12. Twelfth embodiment (Electromagnetic waveguide)
    (1) Configuration example of electromagnetic waveguide 120
    (2) Modified example of electromagnetic waveguide 120
13. Specific bandwidth
14. Other applications

1. First Embodiment (Single-Turn Coil Type 1)

(1) Overview of Metamaterial

First, an outline of a metamaterial having a wave control medium which is a unit structure of a medium that controls wave motion of an electromagnetic wave, a sound wave, and the like is described.

The metamaterial is configured, for example, by aligning a unit structure in a dielectric, the unit structure having a size sufficiently smaller than a wavelength of an electromagnetic wave and having a resonator inside. Note that the interval between the unit structures (resonators) of the metamaterial is set to about 1/10 or less, or about 1/5 or less of the wavelength of the electromagnetic wave to be used.

By setting such a configuration, a permittivity ε and/or a permeability μ of the metamaterial can be artificially controlled, and a refractive index n $(=\pm[\varepsilon \cdot \mu]^{1/2})$ of the metamaterial can be artificially controlled. In particular, in the metamaterial, the refractive index can be set to a negative value with respect to an electromagnetic wave having a desired wavelength by appropriately adjusting, for example, a shape, a dimension, and the like of the unit structure to simultaneously realize the negative permittivity and the negative permeability.

Incidentally, a resonance (operation) frequency ω of the metamaterial is determined by an inductance L and a capacitance C in a case where the metamaterial is described as a circuit according to the LC circuit theory, and the larger the inductance L and the capacitance C, the lower the resonance frequency. That is, a high-density structure having a large inductance L and a large capacitance C can function for a wave having a long wavelength (=a low frequency) even with a small metamaterial.

Therefore, in the present embodiment, in order to put the metamaterial as described above into practical use, an example of a configuration of a wave control medium is described, the wave control medium being a unit structure of the metamaterial that can absorb and control the wave motion while simultaneously realizing downsizing and wider bandwidth of the metamaterial.

(2) Configuration Example of Wave Control Medium 1

A configuration example of a wave control medium 1 according to the first embodiment of the present technology is described with reference to FIGS. 1A and 1B. FIG. 1A is a perspective view showing a configuration example of the wave control medium 1 of a single-turn coil type 1 according to the present embodiment. FIG. 1B is a diagram for explaining impedance matching of the wave control medium 1. The wave control medium 1 according to the present embodiment is a unit structure of the metamaterial and can control the wave motion of an electromagnetic wave, a sound wave, and the like.

As shown in FIG. 1A, the wave control medium 1 includes, as an example, a three-dimensional microstructure having a base 2 formed in a substrate or a rectangular parallelepiped, a spiral part 3 having a spiral structure, and a matching element 4 disposed between the base 2 and the spiral part 3. Such a three-dimensional microstructure includes a material selected from any one of a metal, a dielectric, a magnetic body, a semiconductor, and a superconductor, or a combination of a plurality of these materials.

As an example, a loss type element including a resistor, a circuit type element including a capacitor and an inductor, or the like can be applied as the matching element 4.

The wave control medium 1 according to the present embodiment provides a solution for simultaneously achieving downsizing and wider bandwidth using a single-turn coil having a three-dimensional spiral structure as a unit microstructure of the metamaterial.

A metamaterial having a three-dimensional coil structure is known to resonate with a wave having a wavelength of about the same length to a coil length of the metamaterial and a shorter wave having a wavelength being a fraction of the wavelength by a constant value, and to exhibit broadband characteristics in which a plurality of resonance peaks is broad-coupled. Therefore, according to the wave control medium 1, it is possible to realize a metamaterial having the broadband characteristics by being downsized with a fine structure and including the spiral part 3 having a three-dimensional coil structure.

Moreover, an impedance value Z1 of the spiral part 3 and an impedance value Z2 of the base 2 are greatly different from each other due to a difference in materials. Therefore, when the base 2 and the spiral part 3 are directly joined to each other, due to impedance mismatch between the base 2 and the spiral part 3, an incident wave IW such as an electromagnetic wave is reflected at a matching portion between the base 2 and the spiral part 3, and the wave motion cannot be absorbed. That is, energy cannot be dissipated in the substrate in the base 2.

As shown in FIGS. 1A and 1B, in the wave control medium 1, the matching element 4 having an impedance value Z3 for filling a difference between the impedance values of the base 2 and the spiral part 3 is disposed between the base 2 and the spiral part 3 to make the entire impedance value to change gently, which enables a reflected wave RW to be absorbed in the base 2.

Therefore, according to the wave control medium 1, it is possible to absorb and control the wave motion while achieving downsizing and wider bandwidth of the metamaterial and the like having the wave control medium 1. Moreover, according to the wave control medium 1, it is possible to provide a three-dimensional metamaterial exhibiting an electromagnetic wave absorbing function with high efficiency over a wide frequency band.

Furthermore, according to the wave control medium 1, the wave control element (an antenna, a lens, a speaker and the like) using the wave control medium 1 can be significantly downsized. In addition, according to the wave control medium 1, new shielding functions such as complete shielding, absorption, rectification, and filtering that cannot be realized by a natural material can be performed. Moreover, the wave control medium 1 can exhibit the above effects not only in an electromagnetic wave but also in a wide range such as a light wave or a sound wave. In particular, the wave control medium 1 can exert an effect in a region having a long wavelength and a wide band.

In addition, the wave control medium 1 can provide a wave control member including the wave control medium 1. As the wave control member, for example, an antireflection film, an antireflection coating material, a filter, an energy conversion member, a photoelectric conversion member, and the like can be applied.

In addition, the wave control medium 1 can provide a wave control device including the wave control medium 1. As the wave control device, for example, an antenna, an infrared sensor, a visible light sensor, an electromagnetic wave measurement device, or the like can be applied.

2. Second Embodiment (Single-Turn Coil Type 2)

Figure 2:
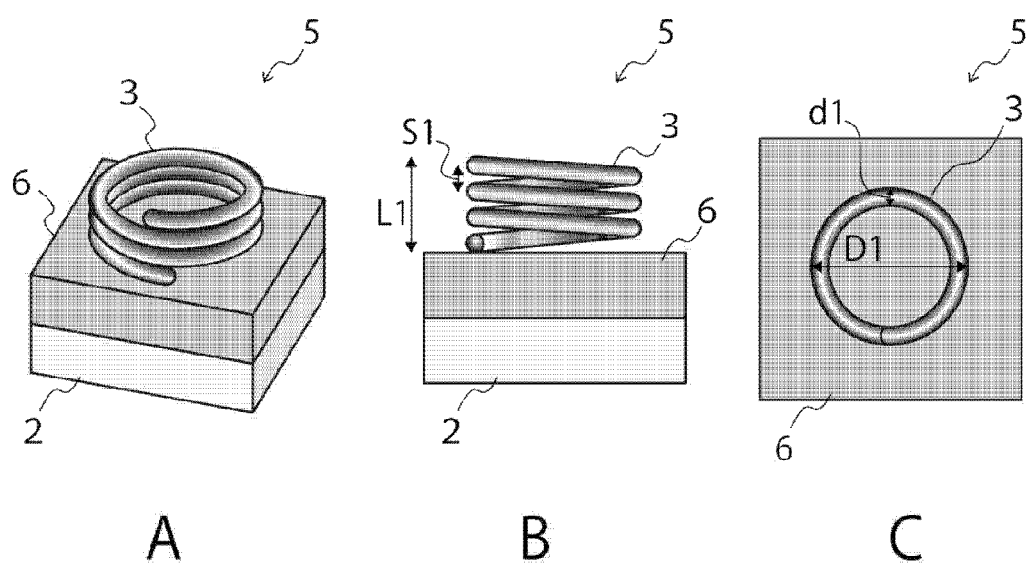
FIG. 2 is a cross-sectional view showing a configuration example of a wave control medium according to a second embodiment of the present technology.

Next, a configuration example of a wave control medium 5 according to a second embodiment of the present technology is described with reference to FIG. 2. FIG. 2A is a perspective view showing a configuration example of the wave control medium 5 of a single-turn coil type 2 according to the present embodiment. FIG. 2B is a side view showing a configuration example of the wave control medium 5, and FIG. 2C is a plan view showing a configuration example of the wave control medium 5. The wave control medium 5 is a unit structure of the metamaterial similarly to the first embodiment.

As shown in FIG. 2A, the wave control medium 5 includes, as an example, a three-dimensional microstructure having a base 2 formed in a substrate or a rectangular parallelepiped, a spiral part 3 having a spiral structure, and a matching element 6 disposed between the base 2 and the spiral part 3. The matching element 6 is disposed on the base 2 over the entire surface facing the spiral part 3.

The base 2 of the wave control medium 5 includes a resin or a dielectric. The spiral part 3 of the wave control medium 5 includes a thin copper wire. The matching element 6 includes a copper plate, a resin, or a resistance element.

As shown in FIG. 2B, a height L1 of the spiral part 3 is preferably $1/100$ to $1/2$ of the wavelength of the incident wave motion, and a width S1 of one turn of the spiral part 3 in the direction perpendicular to the surface of the base 2 is preferably $1/1000$ to $1/10$ of the wavelength of the incident wave motion. The wave control medium 5 has a structure that exerts a role equivalent to that of a capacitor by an interval of the width S1.

Furthermore, as shown in FIG. 2C, a diameter D1 of the spiral part 3 is preferably $1/100$ to $1/2$ of the wavelength of the incident wave motion, and a width d1 of the copper thin wire of the spiral part 3 is preferably $1/1000$ to $1/100$ of the wavelength of the incident wave motion.

Therefore, with the above configuration, according to the wave control medium 5, it is possible to absorb and control the wave motion while achieving downsizing and wider bandwidth of a metamaterial and the like having the wave control medium 1, similarly to the first embodiment.

3. Third Embodiment (Multiple Coil Type 1)

Figure 3:
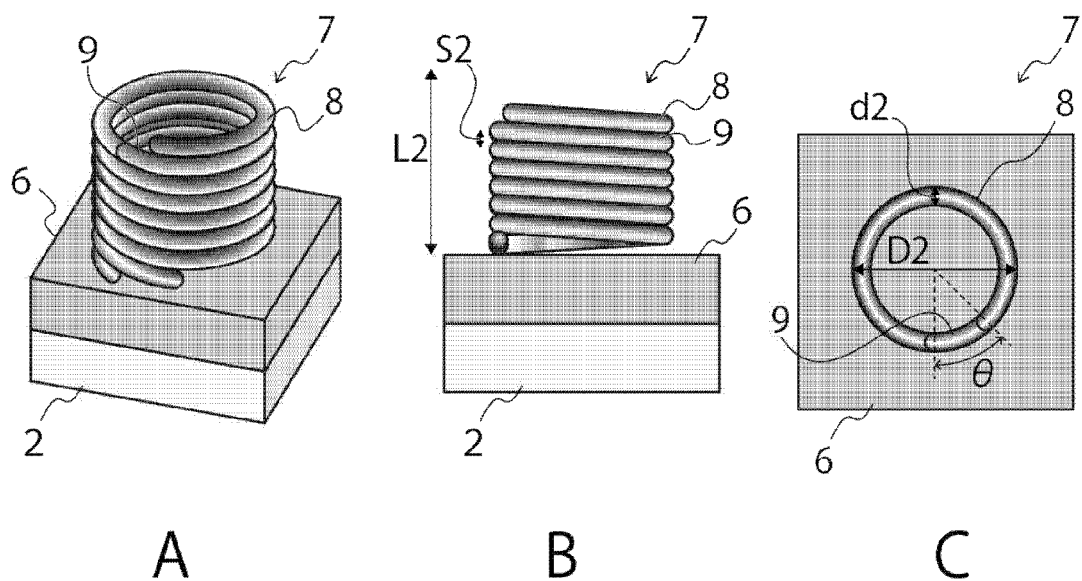
FIG. 3 is a perspective view showing a configuration example of a wave control medium according to a third embodiment of the present technology.

Next, a configuration example of a wave control medium 7 according to a third embodiment of the present technology is described with reference to FIG. 3. FIG. 3A is a perspective view showing a configuration example of the wave control medium 7 of a multiple coil type 1 according to the present embodiment. FIG. 3B is a side view showing a configuration example of the wave control medium 7, and FIG. 3C is a plan view showing a configuration example of the wave control medium 7. The wave control medium 7 is a unit structure of the metamaterial similarly to the first embodiment.

As shown in FIG. 3A, the wave control medium 7 includes, as an example, a three-dimensional microstructure having a base 2 formed in a substrate or a rectangular parallelepiped, spiral parts 8 and 9 having a double spiral structure in which spirals vertically overlap with each other, and a matching element 6 disposed between the base 2 and the spiral parts 8 and 9. The matching element 6 is disposed on the base 2 over the entire surface facing the spiral parts 8 and 9.

As shown in FIG. 3B, a height L2 of the spiral parts 8 and 9 is preferably $1/100$ to $1/2$ of the wavelength of the incident wave motion, and a width S2 of the spiral parts 8 and 9 with respect to the direction perpendicular to the surface of the base 2 is preferably $1/1000$ to $1/10$ of the wavelength of the incident wave motion. The wave control medium 7 has a structure in which each of the spiral parts 8 and 9 has a role equivalent to that of reactance, and has a role equivalent to a capacitor by an interval of the width S2.

Furthermore, as shown in FIG. 3C, a diameter D2 of the spiral parts 8 and 9 is preferably $1/100$ to $1/2$ of the wavelength of the incident wave motion, and a width d2 of the copper thin wire of the spiral parts 8 and 9 is preferably $1/1000$ to $1/100$ of the wavelength of the incident wave motion. Moreover, a deviation in the spiral direction (circumferential direction) between an end of the spiral part 8 and an end of the spiral part 9 is preferably 1° to 90° expressed by a center angle θ of one turn.

The materials of the spiral part 8 and the spiral part 9 are not necessarily the same, and may be different materials. In addition, the spiral part 8 and the spiral part 9 form a capacitor between the lower surface of the spiral part 8 and the upper surface of the spiral part 9 facing each other, and form an inductor by forming a three-dimensional multiple resonance structure by the spiral structure of the spiral part 8 and the spiral part 9.

The wave control medium 7 multiplexes the three-dimensional coil structure to increase inductance, and meanwhile, increases capacitance by acting as a capacitor between the thin wires. Therefore, according to the wave control medium 7, it is possible to realize a metamaterial having the broadband characteristics by being downsized with a fine structure and having the three-dimensional multiple resonance structure. In addition, the wave control medium 7 can absorb and control the wave motion by including the matching element 6, similarly to the first embodiment.

4. Fourth Embodiment (Multiple Coil Type 2)

(1) Configuration Example of Wave Control Medium 10

Figure 4:
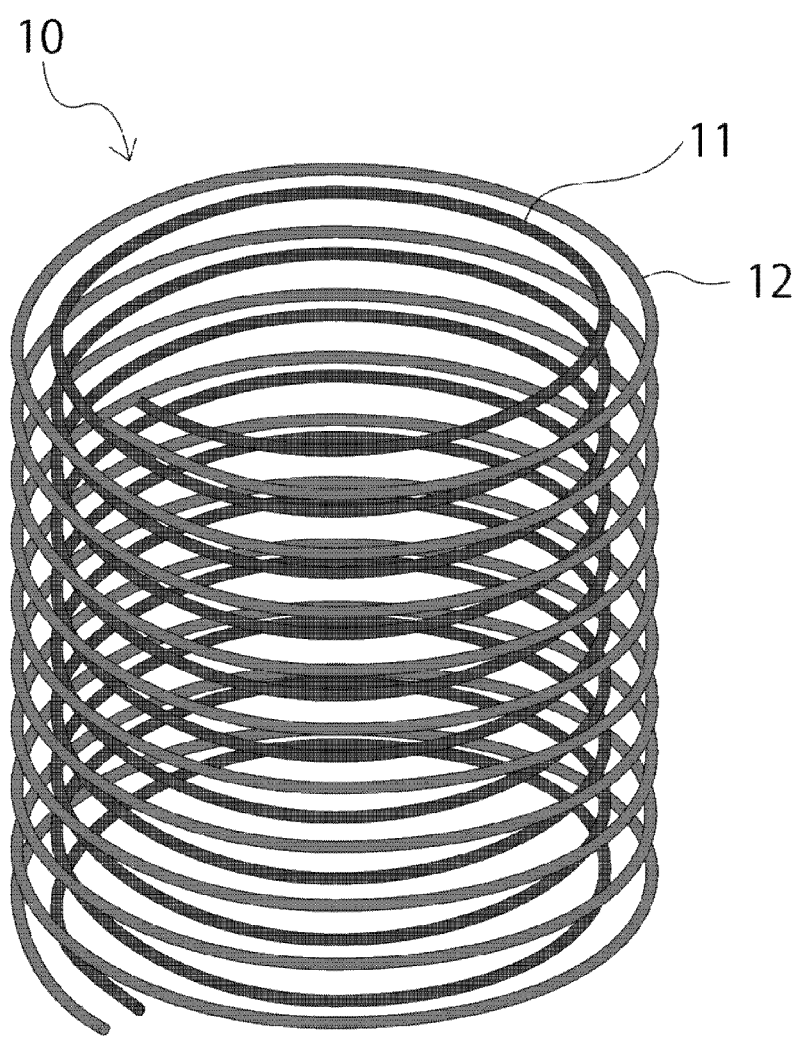
FIG. 4 is a perspective view showing a configuration example of a wave control medium according to a fourth embodiment of the present technology.

Next, a configuration example of a wave control medium 10 according to a fourth embodiment of the present technology is described with reference to FIG. 4. FIG. 4 is a perspective view showing a configuration example of a wave control medium 10 according to the present embodiment. The wave control medium 10 according to the present embodiment is a unit structure of the metamaterial and can control the wave motion of an electromagnetic wave, a sound wave, and the like.

As shown in FIG. 4, the wave control medium 10 includes a coil 11 and a coil 12 which constitute a three-dimensional microstructure having a spiral structure. The wave control medium 10 forms a double spiral structure of thin wires in which the coils are wound in parallel to each other while the coil 12 faces the outer side of the coil 11. The wave control medium 10 is not limited to a double coil, and may have a multiple coil structure of three or more. In the case of multiple coils of three or more, the facing directions of the coils are not limited to be in the parallel positional relationship to each other, and it is sufficient that the coils are arranged so as not to be in direct contact with each other.

Each of the coil 11 and the coil 12 has a shape of a thin wire, the wire including a material selected from any one of a metal, a dielectric, a magnetic body, a semiconductor, and a superconductor, or a combination of a plurality of these materials. The materials of the coil 11 and the coil 12 are not necessarily the same, and may be different materials. In addition, the coil 11 and the coil 12 form a capacitor between the side surface of the coil 11 and the side surface of the coil 12 facing each other, and form an inductor by forming a three-dimensional multiple resonance structure by the spiral structure of the coil 11 and the coil 12.

The wave control medium 10 according to the present embodiment provides a solution for simultaneously achieving downsizing and wider bandwidth using a multiple coil as a unit microstructure of the metamaterial, the multiple coil having a three-dimensional spiral structure including the plurality of conductor thin wires facing each other.

A metamaterial having a three-dimensional coil structure is known to resonate with a wave having a wavelength of about the same length to a coil length of the metamaterial and a shorter wave having a wavelength being a fraction of the wavelength by a constant value, and to exhibit broadband characteristics in which a plurality of resonance peaks is broad-coupled. Furthermore, the relationship between the size and the wavelength of a metamaterial structure depends on inductance and capacitance when the metamaterial structure is regarded as an equivalent circuit, and a metamaterial having a larger inductance and a larger capacitance can be made smaller.

The wave control medium 10 multiplexes the three-dimensional coil structure to increase inductance, and meanwhile, increases capacitance by acting as a capacitor between the thin wires. Therefore, according to the wave control medium 10, it is possible to realize a metamaterial having the broadband characteristics by being downsized with a fine structure and having the three-dimensional multiple resonance structure.

Furthermore, according to the wave control medium the wave control element (an antenna, a lens, a speaker and the like) using the wave control medium 10 can be significantly downsized. In addition, according to the wave control medium 10, new shielding functions such as complete shielding, absorption, rectification, and filtering that cannot be realized by a natural material can be performed. Moreover, the wave control medium 10 can exhibit the above effect not only in an electromagnetic wave but also in a wide range such as a light wave or a sound wave. In particular, the wave control medium 10 can exert an effect in a region having a long wavelength and a wide band.

(2) Example of Manufacturing Method of Wave Control Medium 10

Next, an example of a manufacturing method of the wave control medium 10 according to the present embodiment is described.

The wave control medium 10 can be manufactured by a molecular template method as an example. Here, the molecular template method refers to a method in which a microscopic and complicated structure obtained from an organic substance (such as artificial/biopolymer, nanoparticle, and liquid crystal molecule) is used as a template to form a microstructure including a material selected from any one of a metal, a dielectric, a magnetic body, a semiconductor, a superconductor, and the like, or a combination of a plurality of these materials. As the molecular template method, two methods described later are mainly known.

The first method is a method of coating an organic structure with plating or the like. The second method is a method of using a structure formed by using an organic substance into which a precursor such as a metal or an oxide is previously introduced, and the structure is fired, oxidized and reduced, and like to convert the precursor into a metal, an oxide, or the like.

In the present embodiment, the wave control medium 10 including the coil 11 and the coil 12 having a metal spiral structure is manufactured by using a three-dimensional spiral structure including an organic substance as a template and applying electrolysis or electroless plating to the structure. In the manufacturing process of the wave control medium 10, the coil 11 and the coil 12 can be formed in a three-dimensional fine structure by utilizing self-assembly of the organic substance. According to the manufacturing method of the present embodiment, it is possible to easily manufacture the wave control medium 10 having a complicated and microscopic three-dimensional microstructure that is difficult to manufacture by a normal method.

Note that the wave control medium 10 may be manufactured by a method of forming a three-dimensional spiral structure using the fact that a metal pattern is deflected due to stress after etching of a metal film manufactured on a substrate such as a dielectric.

5. Fifth Embodiment (Coaxial Cable Type)

Figure 5:
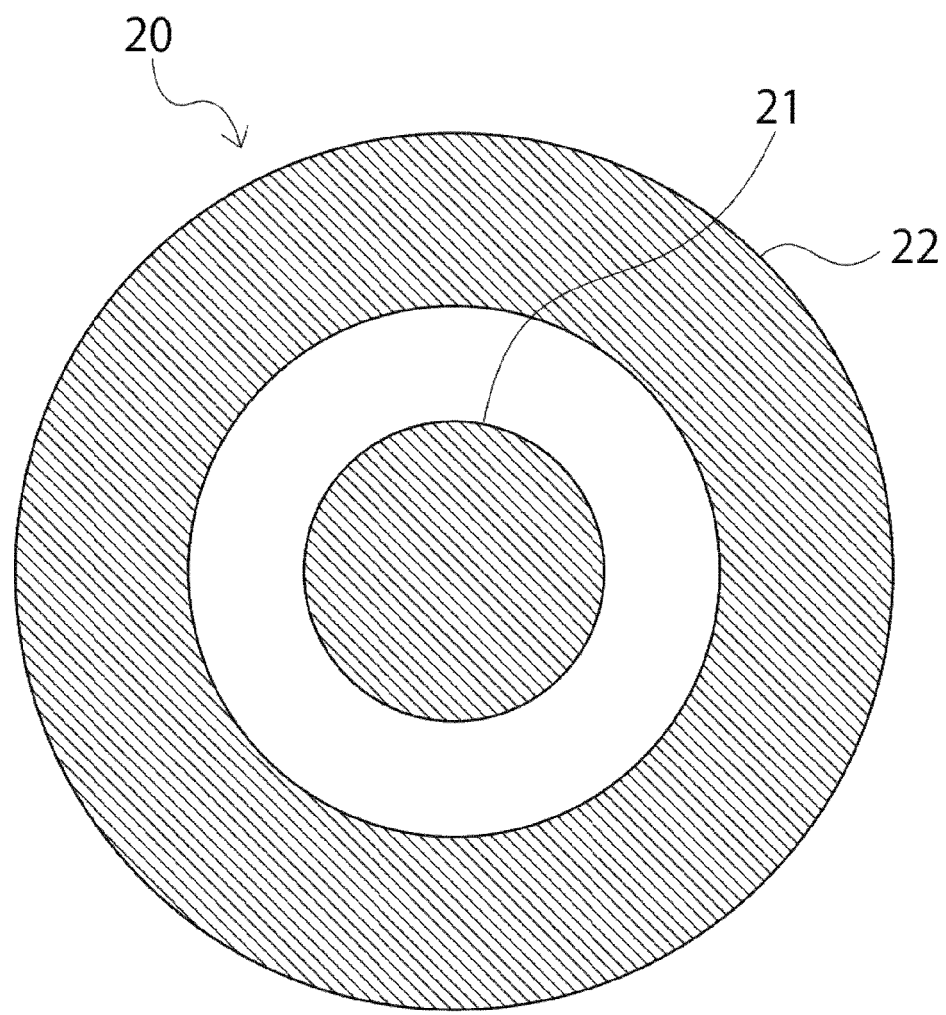
FIG. 5 is a cross-sectional view showing a configuration example of a wave control medium according to a fifth embodiment of the present technology.

Next, a configuration example of a wave control medium 20 according to a fifth embodiment of the present technology is described with reference to FIG. 5. FIG. 5 is a cross-sectional view showing a configuration example of the wave control medium 20 of a coaxial cable type according to the present embodiment. The wave control medium 20 according to the present embodiment is a unit structure of the metamaterial similarly to the first embodiment.

As shown in FIG. 5, the wave control medium 20 has a shape of a coaxial cable type. The wave control medium 20 is formed in, for example, a two-layer structure having a shape in which an outer surface of a coil 21, which constitutes a three-dimensional microstructure having a spiral structure similarly to the wave control medium 10 according to the first embodiment, is covered with the inner surface of a coil 22 with a minute space interposed therebetween. The wave control medium 20 forms a single coil structure as a whole, but has two three-dimensional microstructures including the coil 22 and the coil 21 incorporated in the coil 22. Note that the wave control medium 20 is not limited to a two-layer structure and may have three or more layers, and is not limited to a single coil as a whole and may have a double or more multi-coil structure.

The coil 21 and the coil 22 each have a shape of a thin wire. The coil 21 and the coil 22 form a capacitor between the outer side surface of the coil 21 and the inner side surface of the coil 22 facing each other, and form an inductor by forming a three-dimensional multiple resonance structure by the spiral structure of the coil 21 and the coil 22.

The wave control medium 20 multiplexes the three-dimensional coil structure to increase inductance, and meanwhile, increases capacitance by acting as a capacitor in a space between the outer side surface of the coil 21 and the inner side surface of the coil 22, both of which are the thin wires. Therefore, according to the wave control medium 20, it is possible to realize a metamaterial having the broadband characteristics by being downsized with a fine structure and having the three-dimensional multiple resonance structure similarly to the first embodiment.

6. Sixth Embodiment (Double Gyroid Type)

Figure 6:
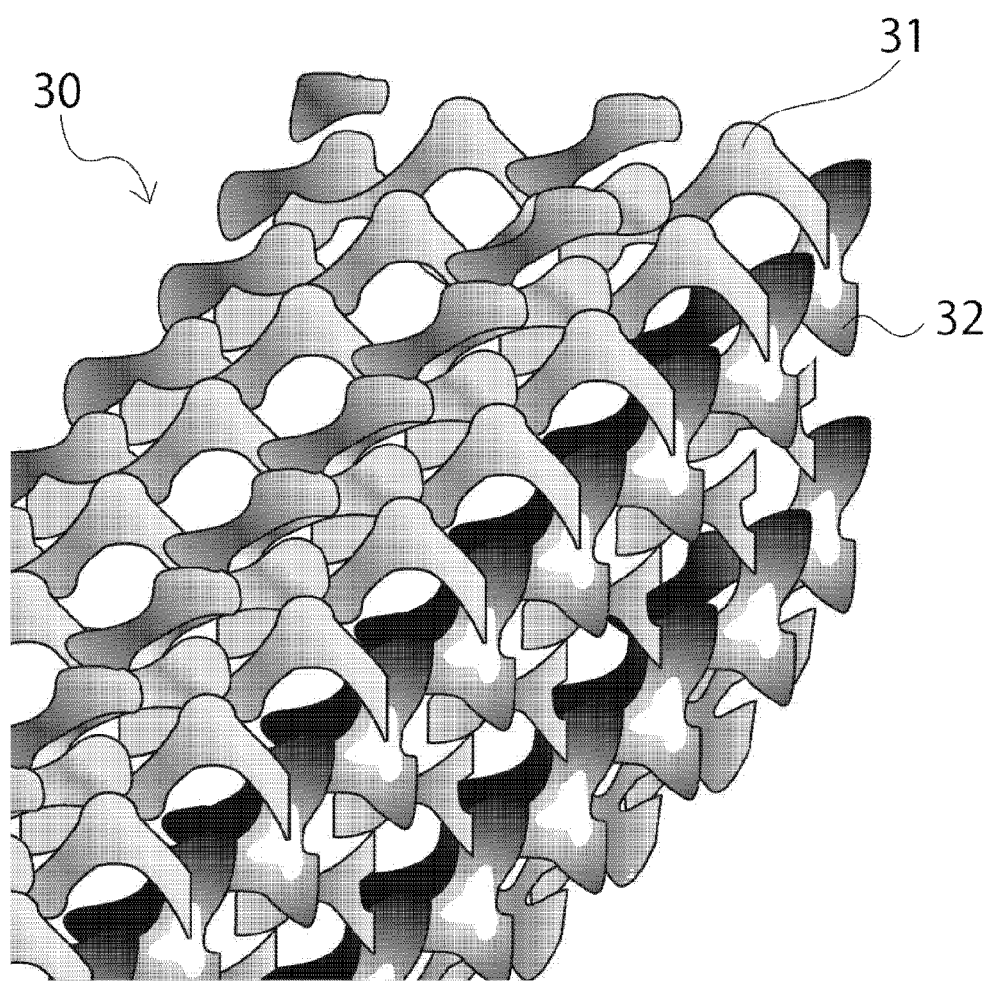
FIG. 6 is a perspective view showing a configuration example of a wave control medium according to a sixth embodiment of the present technology.

Next, a configuration example of a wave control medium 30 according to a sixth embodiment of the present technology is described with reference to FIG. 6. FIG. 6 is a perspective view showing a configuration example of a wave control medium 30 of a double gyroid type according to the present embodiment. The wave control medium 30 according to the present embodiment is also a unit structure of the metamaterial similarly to the first embodiment.

As shown in FIG. 6, the wave control medium 30 has a shape of a double gyroid type. Here, the double gyroid refers to a continuous structure in which two coils face each other and are entangled without being in contact with each other.

The wave control medium 30 includes a coil 31 and a coil 32 of a three-dimensional microstructure, and forms a continuous three-dimensional structure in which the coil 31 and the coil 32 face each other and are entangled without being in contact with each other. Note that the wave control medium 30 is not limited to a double gyroid having a double coil structure, and may be a gyroid having a multiple coil structure of three or more.

The coil 31 and the coil 32 each have a shape of a thin wire. The coil 31 and the coil 32 form a capacitor between the side surface of the coil 31 and the side surface of the coil 22 facing each other, and form an inductor by forming a three-dimensional multiple resonance structure by the continuous three-dimensional structure of the coil 31 and the coil 32.

The wave control medium 30 multiplexes the three-dimensional coil structure to increase inductance, and meanwhile, increases capacitance by acting as a capacitor in a space between the side surface of the coil 31 and the side surface of the coil 22, both of which are the thin wires. Therefore, according to the wave control medium 30, it is possible to realize a metamaterial having the broadband characteristics by being downsized with a fine structure and having the three-dimensional multiple resonance structure similarly to the first embodiment.

7. Seventh Embodiment (Cone Type)

Figure 7:
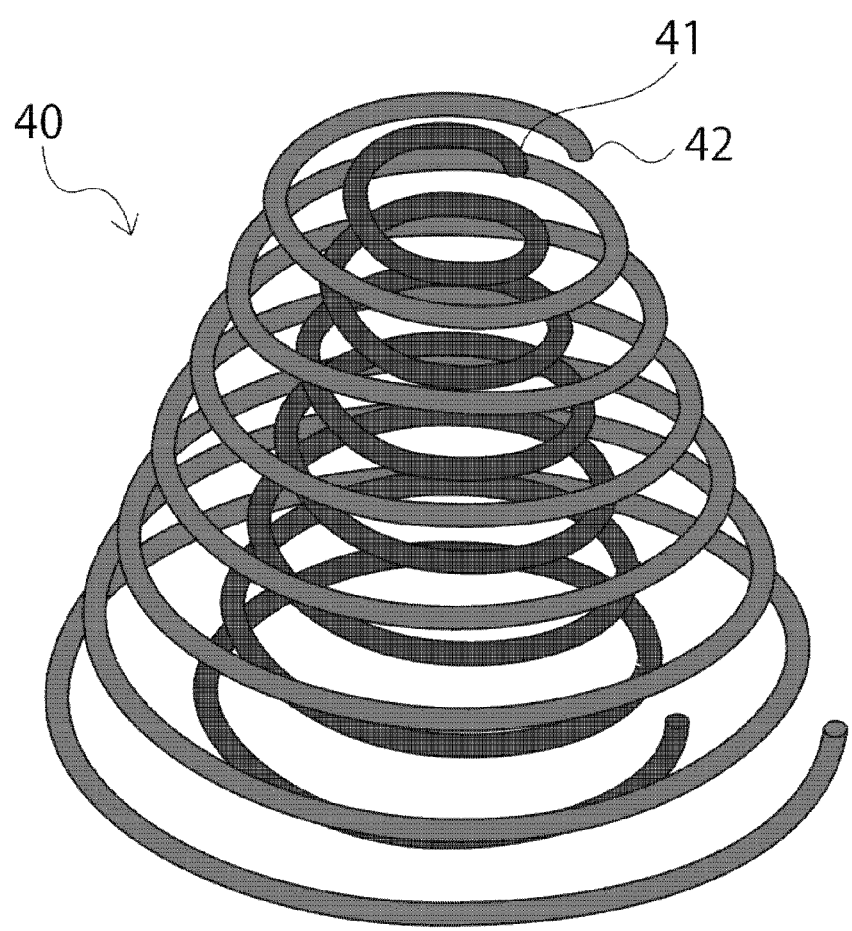
FIG. 7 is a perspective view showing a configuration example of a wave control medium according to a seventh embodiment of the present technology.

Next, a configuration example of a wave control medium 40 according to a seventh embodiment of the present technology is described with reference to FIG. 7. FIG. 7 is a perspective view showing a configuration example of a wave control medium 40 of a cone type according to the present embodiment. The wave control medium 40 according to the present embodiment is also a unit structure of the metamaterial similarly to the first embodiment.

As shown in FIG. 7, the wave control medium 40 as a whole has a shape of a cone type extending downward in the paper surface of FIG. 7. The wave control medium 40 includes a coil 41 and a coil 42 of a three-dimensional microstructure, and forms a double spiral structure of thin wires in which the coils are wound in parallel to each other while the coil 42 faces the outer side of the coil 41. Note that the wave control medium 40 is not limited to a double coil, and may have a multiple coil structure of three or more. Furthermore, the wave control medium 40 as a whole has a shape of a cone type narrowing downward in the paper surface of FIG. 7.

The coil 41 and the coil 42 each have a shape of a thin wire. The coil 41 and the coil 42 form a capacitor between the side surface of the coil 41 and the side surface of the coil 42 facing each other, and form an inductor by forming a three-dimensional multiple resonance structure by the cone spiral structure of the coil 41 and the coil 42.

The wave control medium 40 multiplexes the three-dimensional coil structure to increase inductance, and meanwhile, increases capacitance by acting as a capacitor in a space between the side surface of the coil 41 and the side surface of the coil 42, both of which are the thin wires. Therefore, according to the wave control medium 40, it is possible to realize a metamaterial having the broadband characteristics by being downsized with a fine structure and having the three-dimensional multiple resonance structure similarly to the first embodiment.

8. Eighth Embodiment (Combination with Wire Structure)

(1) Combination of a Plurality of Structures

In an eighth embodiment of the present technology, an example in which a wave control medium is designed by a combination of a plurality of structures is described. The purpose of combining the plurality of structures is, for example, to provide a structure in which each structure functions with respect to an electric field and a magnetic field constituting an electromagnetic wave. That is, it is an object to share functions by each of the structures.

Here, functioning with respect to the electric field will control a relative permittivity $\varepsilon_r$, and functioning with respect to the magnetic field will control the relative permeability $\mu_r$. Therefore, the wave control medium according to the present embodiment can control the relative permittivity and the relative permeability to desired values with a high degree of freedom by combining a plurality of structures.

(2) Configuration Example of Wave Control Medium 50

Figure 8:
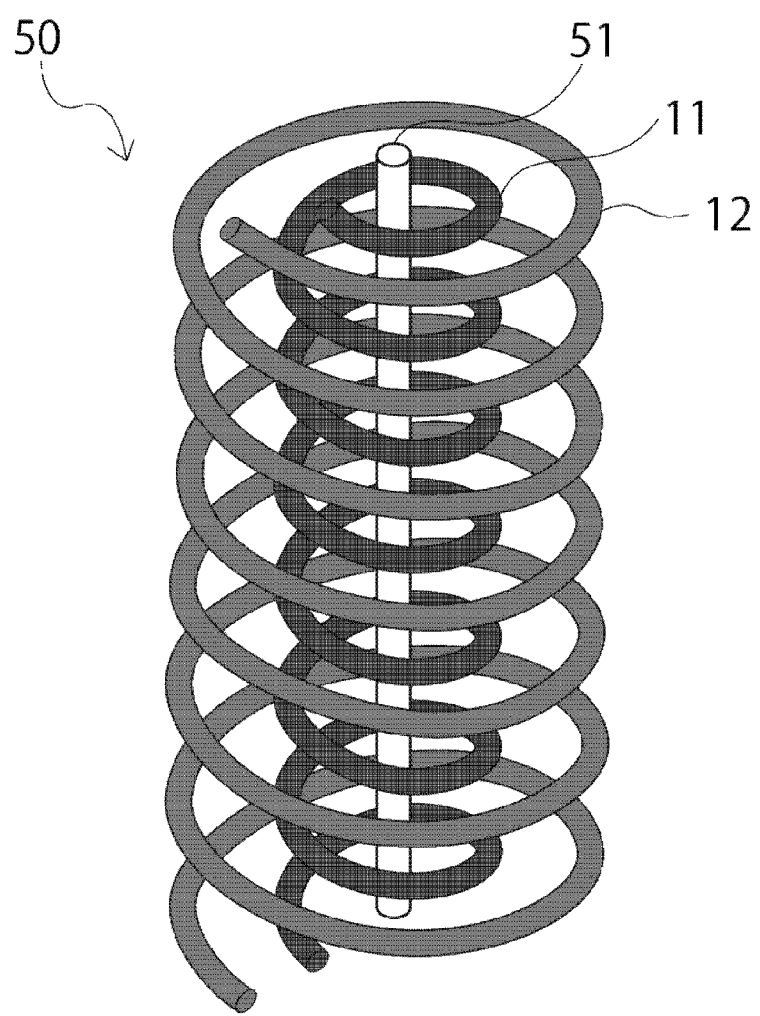
FIG. 8 is a perspective view showing a configuration example of a wave control medium according to an eighth embodiment of the present technology.

Next, a configuration example of a wave control medium 50 according to the eighth embodiment of the present technology is described with reference to FIG. 8. FIG. 8 is a perspective view showing a configuration example of the wave control medium 50 according to the present embodiment. The wave control medium 50 is different from the wave control medium 10 according to the first embodiment in that a wire structure is combined with a double coil structure. Other configurations of the wave control medium 50 are similar to those of the wave control medium 10.

As shown in FIG. 8, the wave control medium 50 includes a coil 11 and a coil 12 which constitute a three-dimensional microstructure having a spiral structure. The wave control medium 50 forms a double spiral structure of thin wires in which the coils are wound in parallel to each other while the coil 12 faces the outer side of the coil 11. Moreover, the wave control medium 50 is provided with a rod-like thin wire 51 extending in a direction in which the central axis extends at a central axis position of the spiral structure on the inner side of the coil 11. The wire 51 is disposed separated from the coil 11 by a minute interval.

The coil of the wave control medium 50 is not limited to a double coil, and may be a single coil or have a multiple coil structure of three or more. In the case of multiple coils of three or more, the facing directions of the coils are not limited to be in the parallel positional relationship to each other, and it is sufficient that the coils are arranged so as not to be in direct contact with each other.

Similarly to the coil 11 and the coil 12, the wire 51 has a shape of a thin wire, the wire including a material selected from any one of a metal, a dielectric, a magnetic body, a semiconductor, and a superconductor, or a combination of a plurality of these materials. In addition, the material of the wire 51 is not necessarily the same as that of the coil 11 and the coil 12, and the materials may be different from each other. Moreover, the number of wires 51 is not limited to one, and may be two or more. Note that the wire 51 is not limited to a state of being contained in the coil 11 and the coil 12, and may be in a state of being adjacent to or near the coil 11 and the coil 12.

In the wave control medium 50, it is assumed that an electric field direction of the radio wave to be applied coincides with a vibration direction of electrons in which the wire 51 extends, and a magnetic field direction of the radio wave to be applied is orthogonal to a magnetic force direction electromagnetically induced by the annular current flowing in the coil 11 and the coil 12. At this time, the wire 51 functions to the magnetic field, and the coil 11 and the coil 12 function to the electric field. That is, the electrons vibrating along the wire 51 function with respect to the magnetic field. In addition, the coil 11 and the coil 12 function with respect to the electric field.

Here, functioning with respect to the magnetic field will control the relative permeability $\mu_r$, and functioning with respect to the electric field will control the relative permittivity $\varepsilon_r$. Therefore, the wave control medium 50 can control the relative permeability and the relative permittivity to desired values with a high degree of freedom by combining a plurality of structures.

According to the wave control medium 50 according to the present embodiment, in addition to the similar effects as those of the wave control medium 10 according to the first embodiment, in a case where desired physical properties are difficult to be obtained only by the spiral structure of the coil 11 and the coil 12, the relative permeability and/or the relative permittivity can be finely adjusted by performing function role-sharing by combining the structure of the wire 51 to the spiral structure. Moreover, because the wave control medium 50 also serves as a capacitor between the wire 51 and the coil 11, the capacitance can be increased more than that of the wave control medium 10.

(3) Modified Example 1 of Wave Control Medium 50

Figure 9:
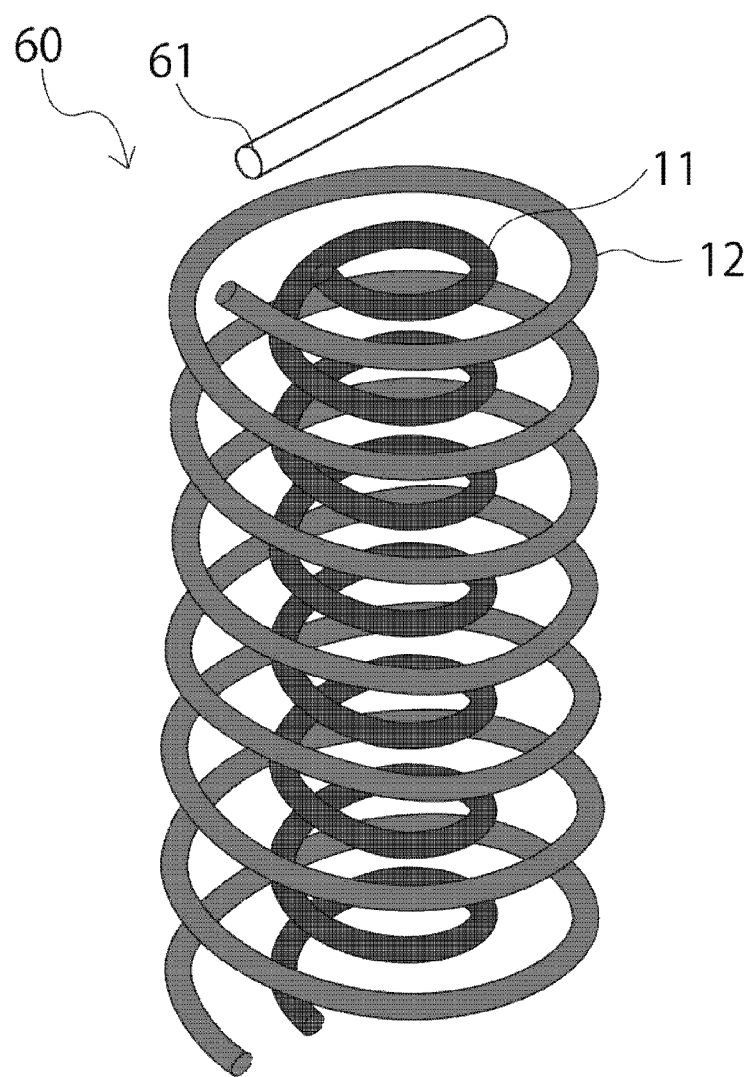
FIG. 9 is a perspective view showing a modified example of the wave control medium according to the eighth embodiment of the present technology.

Next, a modified example 1 of the wave control medium 50 is described with reference to FIG. 9. FIG. 9 is a perspective view showing a configuration example of a wave control medium 60 as the modified example 1 of the wave control medium 50. The wave control medium 60 is different from the wave control medium 50 in that the wire is located outside the coil and extends in a direction orthogonal to the central axis of the coil. Other configurations of the wave control medium 60 are similar to those of the wave control medium 50.

As shown in FIG. 9, the wave control medium 60 is provided with a rod-like thin wire 61 extending in a direction orthogonal to the central axis of the spiral structure of the coil 11 and the coil 12, on the outer side of the coil 11 and the coil 12. The wire 61 is disposed separated from the coil 12 by a minute interval.

In the wave control medium 60, it is assumed that the electric field direction of the radio wave to be applied coincides with the vibration direction of electrons in which the wire 61 extends, and the magnetic field direction of the radio wave to be applied coincides with the magnetic force direction electromagnetically induced by the annular current flowing in the coil 11 and the coil 12. At this time, the wire 61 functions to the electric field, and the coil 11 and the coil 12 function to the magnetic field. That is, the electrons vibrating along the wire 61 function with respect to the electric field. In addition, when the annular current is generated by vibration of electrons along the coil 11 and the coil 12, the magnetic force is induced at a central axis position in the center of the coil 11 and the coil 12 on the principle of electromagnetic induction, and as a result, the coil 11 and the coil 12 function with respect to the magnetic field.

Here, functioning with respect to the electric field will control the relative permittivity $\varepsilon_r$, and functioning with respect to the magnetic field will control the relative permeability $\mu_r$. Therefore, the wave control medium 60 can control the relative permittivity and the relative permeability to desired values with a high degree of freedom by combining a plurality of structures.

According to the wave control medium 60 according to the present modified example, similarly to the wave control medium 50, in a case where desired physical properties are difficult to be obtained only by the spiral structure of the coil 11 and the coil 12, the relative permittivity and/or the relative permeability can be finely adjusted by performing function role-sharing by combining the structure of the wire 61 to the spiral structure.

(4) Modified Example 2 of Wave Control Medium 50

Figure 10:
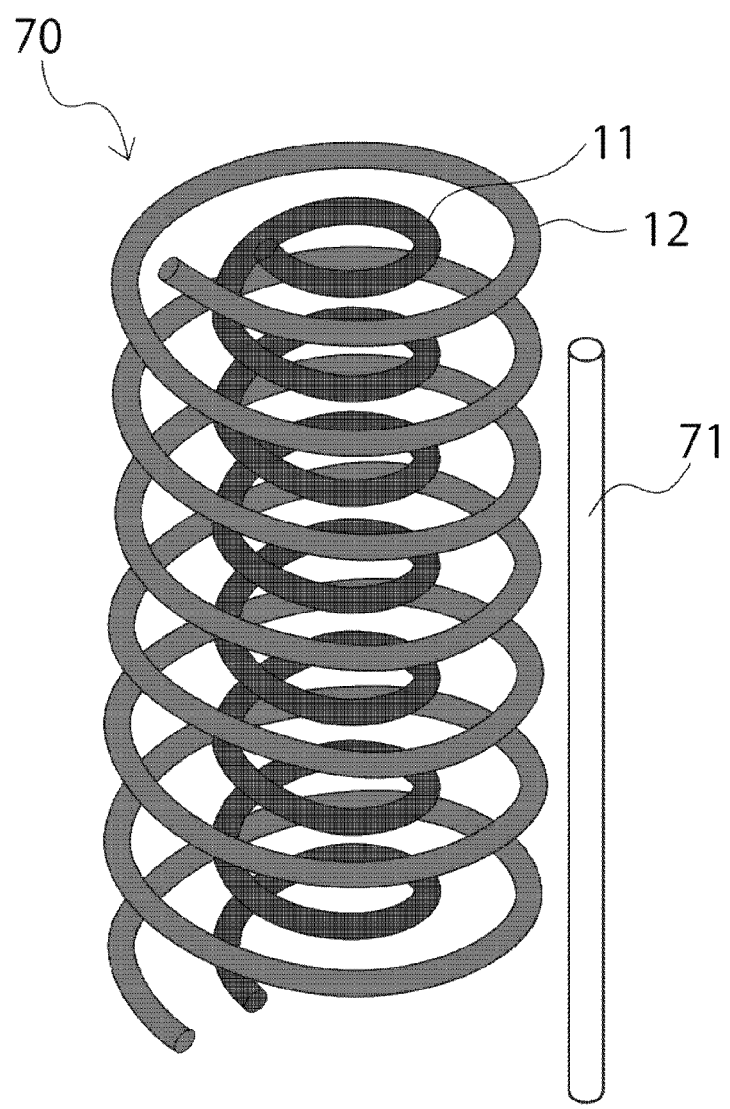
FIG. 10 is a perspective view showing another modified example of the wave control medium according to the eighth embodiment of the present technology.

Next, a modified example 2 of the wave control medium 50 is described with reference to FIG. 10. FIG. 10 is a perspective view showing a configuration example of a wave control medium 70 as the modified example 2 of the wave control medium 50. The wave control medium 70 is different from the wave control medium 50 in that the wire is located outside the coil. Other configurations of the wave control medium 70 are similar to those of the wave control medium 50.

As shown in FIG. 10, the wave control medium 70 is provided with a rod-like thin wire 71 extending in a direction parallel to the central axis of the spiral structure of the coil 11 and the coil 12, on the outer side of the coil 11 and the coil 12. The wire 71 is disposed separated from the coil 12 by a minute interval.

In the wave control medium 70, it is assumed that the electric field direction of the radio wave to be applied coincides with the vibration direction of electrons in which the wire 71 extends, and the magnetic field direction of the radio wave to be applied is orthogonal to the magnetic force direction electromagnetically induced by the annular current flowing in the coil 11 and the coil 12. At this time, the wire 71 functions to the magnetic field, and the coil 11 and the coil 12 function to the electric field. That is, the electrons vibrating along the wire 71 function with respect to the magnetic field. In addition, the coil 11 and the coil 12 function with respect to the electric field.

The wave control medium 70 according to the present modified example can have the similar effect as the wave control medium 50.

9. Ninth Embodiment (Combination with Plate Structure)

(1) Configuration Example of Wave Control Medium 80

Figure 11:
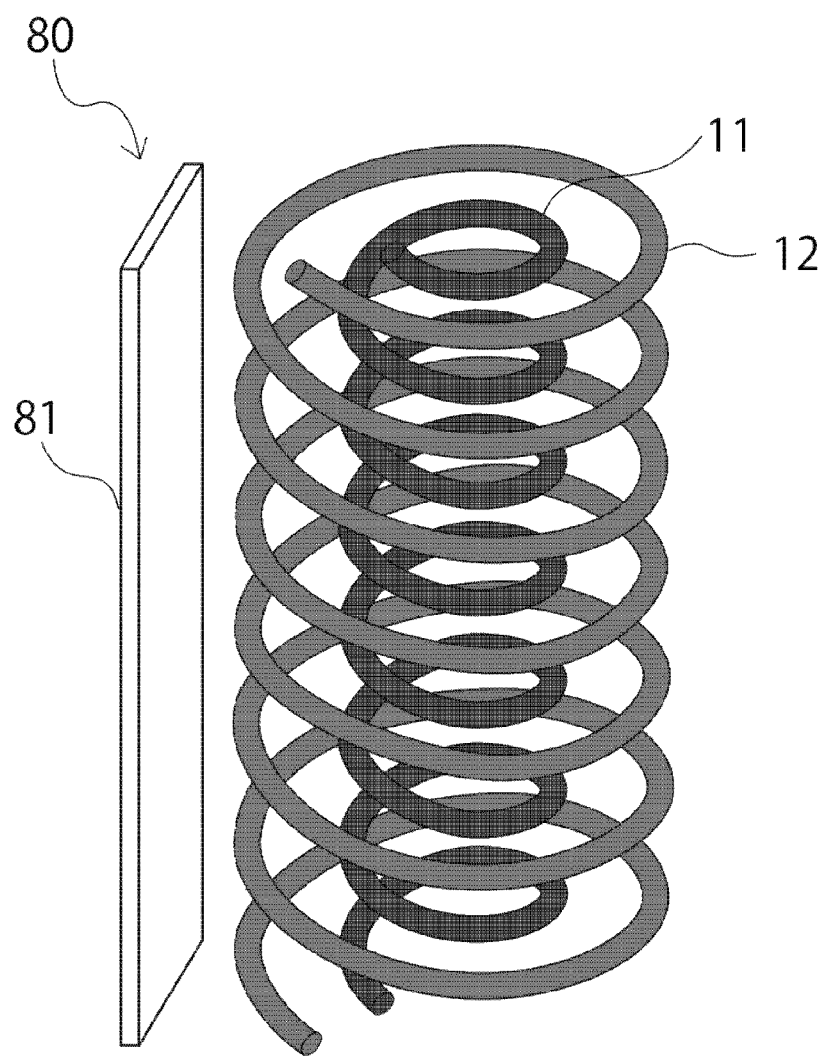
FIG. 11 is a perspective view showing a configuration example of a wave control medium according to a ninth embodiment of the present technology.

Next, a configuration example of a wave control medium 80 according to a ninth embodiment of the present technology is described with reference to FIG. 11. FIG. 11 is a perspective view showing a configuration example of the wave control medium 80 according to the present embodiment. The wave control medium 80 is different from the wave control medium 10 according to the first embodiment in that a plate structure is combined with a double coil structure. Other configurations of the wave control medium 80 are similar to those of the wave control medium 10.

As shown in FIG. 11, the wave control medium 80 includes a coil 11 and a coil 12 similarly to the wave control medium 10. Moreover, the wave control medium 80 is provided with a thin tabular plate 81 extending in a direction parallel to the central axis of the spiral structure of the coil 11 and the coil 12, on the outer side of the coil 11 and the coil 12. The plate 81 is disposed separated from the coil 12 by a minute interval.

Similarly to the coil 11 and the coil 12, the plate 81 has a shape of a thin wire, the wire including a material selected from any one of a metal, a dielectric, a magnetic body, a semiconductor, and a superconductor, or a combination of a plurality of these materials. In addition, the material of the plate 81 is not necessarily the same as that of the coil 11 and the coil 12, and the materials may be different from each other. Moreover, the number of plates 81 is not limited to one, and may be two or more. Note that the plate 81 can also be provided at a central axis position of the spiral structure on the inner side of the coil 11 so as to be separated from the coil 11 in a direction in which the central axis extends. In this case, because the wave control medium 80 also serves as a capacitor between the plate 81 and the coil 11, the capacitance can be increased more than that of the wave control medium 10.

In the wave control medium 80, it is assumed that the electric field direction of the radio wave to be applied coincides with the vibration direction of electrons in which the plate 81 extends, and the magnetic field direction of the radio wave to be applied is orthogonal to the magnetic force direction electromagnetically induced by the annular current flowing in the coil 11 and the coil 12. At this time, the plate 81 functions to the magnetic field, and the coil 11 and the coil 12 function to the electric field. That is, the electrons vibrating along the plate 81 function with respect to the magnetic field. In addition, the coil 11 and the coil 12 function with respect to the electric field.

Here, functioning with respect to the magnetic field will control the relative permeability P r, and functioning with respect to the electric field will control the relative permittivity E r. Therefore, the wave control medium 80 can control the relative permeability and the relative permittivity to desired values with a high degree of freedom by combining a plurality of structures.

According to the wave control medium 80 according to the present embodiment, in addition to the similar effects as those of the wave control medium 10 according to the first embodiment, in a case where desired physical properties are difficult to be obtained only by the spiral structure of the coil 11 and the coil 12, the relative permeability and/or the relative permittivity can be finely adjusted by performing function role-sharing by combining the structure of the plate 81 to the spiral structure.

(2) Modified Example of Wave Control Medium 80

Figure 12:
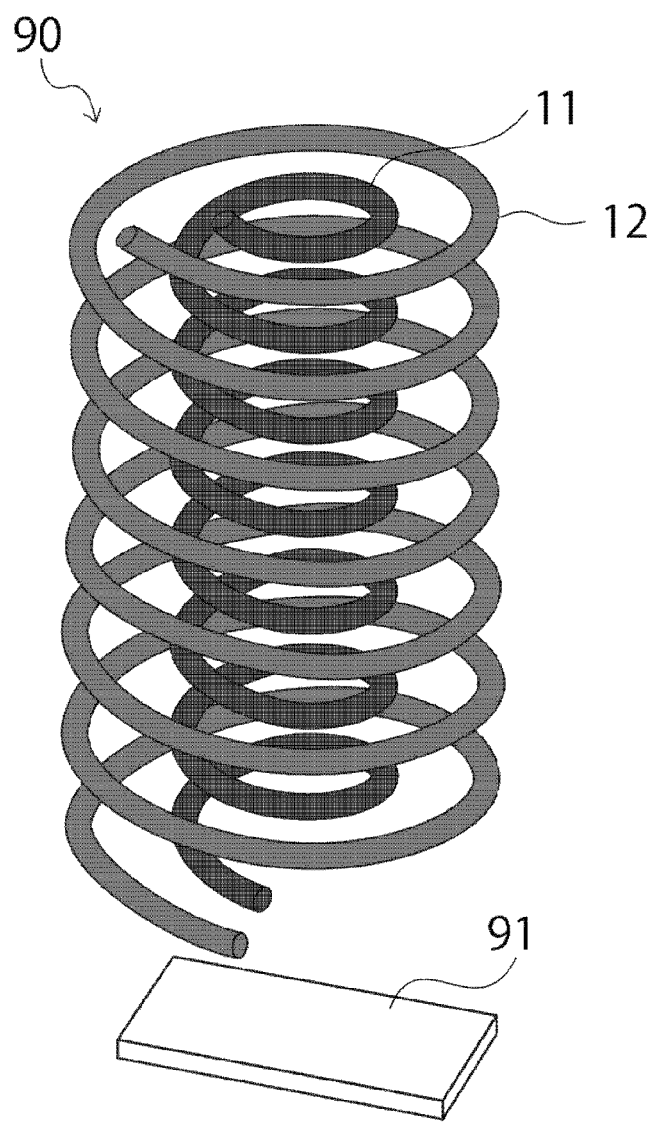
FIG. 12 is a perspective view showing a modified example of the wave control medium according to the ninth embodiment of the present technology.

Next, a modified example of the wave control medium 80 is described with reference to FIG. 12. FIG. 12 is a perspective view showing a configuration example of a wave control medium 90 as the modified example of the wave control medium 80. The wave control medium 90 is different from the wave control medium 80 in that the plate extends in a direction orthogonal to the central axis of the coil. Other configurations of the wave control medium 90 are similar to those of the wave control medium 90.

As shown in FIG. 12, the wave control medium 90 is provided with a tabular thin plate 91 extending in a direction orthogonal to the central axis of the spiral structure of the coil 11 and the coil 12, on the outer side of the coil 11 and the coil 12. The plate 91 is disposed separated from the coil 12 by a minute interval.

In the wave control medium 90, it is assumed that the electric field direction of the radio wave to be applied coincides with the vibration direction of electrons in which the plate 91 extends, and the magnetic field direction of the radio wave to be applied coincides with the magnetic force direction electromagnetically induced by the annular current flowing in the coil 11 and the coil 12. At this time, the plate 91 functions to the electric field, and the coil 11 and the coil 12 function to the magnetic field. That is, the electrons vibrating along the plate 91 function with respect to the electric field. In addition, when the annular current is generated by vibration of electrons along the coil 11 and the coil 12, the magnetic force is induced at a central axis position in the center of the coil 11 and the coil 12 on the principle of electromagnetic induction, and as a result, the coil 11 and the coil 12 function with respect to the magnetic field.

Here, functioning with respect to the electric field will control the relative permittivity $\varepsilon_r$, and functioning with respect to the magnetic field will control the relative permeability $\mu_r$. Therefore, the wave control medium 90 can control the relative permittivity and the relative permeability to desired values with a high degree of freedom by combining a plurality of structures.

According to the wave control medium 90 according to the present modified example, similarly to the wave control medium 80, in a case where desired physical properties are difficult to be obtained only by the spiral structure of the coil 11 and the coil 12, the relative permittivity and/or the relative permeability can be finely adjusted by performing function role-sharing by combining the structure of the plate 81 to the spiral structure.

10. Tenth Embodiment (Combination with Sphere Structure)

Figure 13:
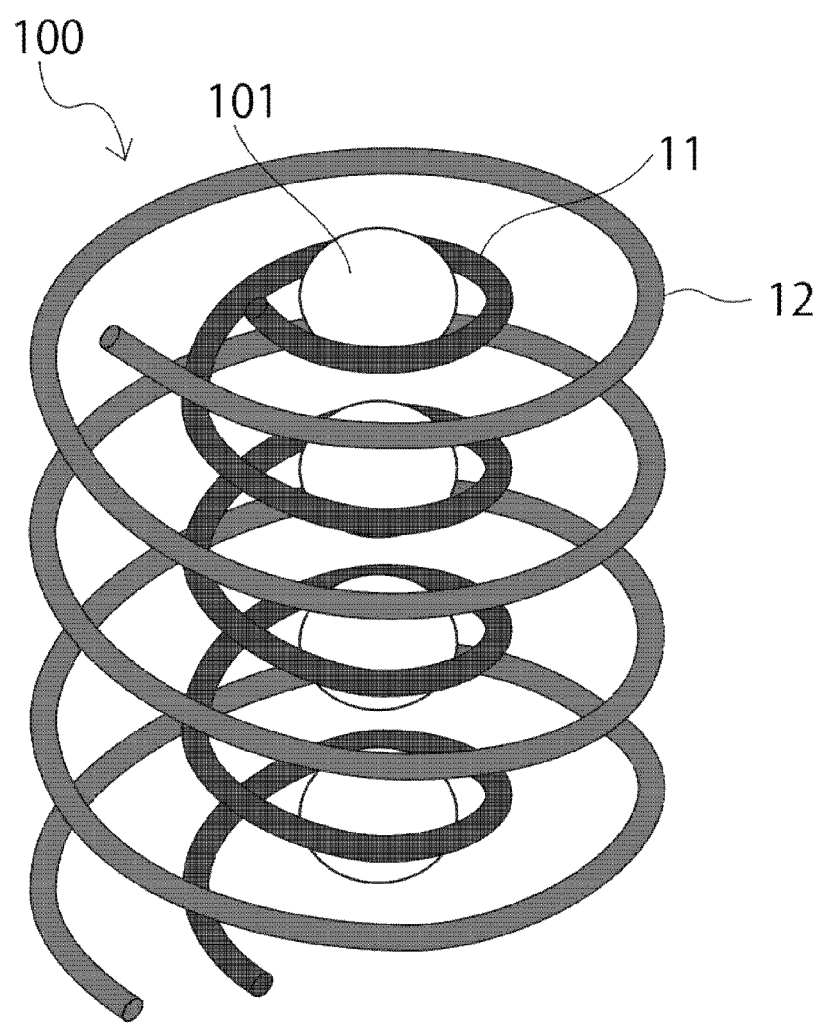
FIG. 13 is a perspective view showing a configuration example of a wave control medium according to a tenth embodiment of the present technology.

Next, a configuration example of a wave control medium 100 according to a tenth embodiment of the present technology is described with reference to FIG. 13. FIG. 13 is a perspective view showing a configuration example of the wave control medium 100 according to the present embodiment. The wave control medium 100 is different from the wave control medium 10 according to the first embodiment in that a sphere structure is combined with a double coil structure. Other configurations of the wave control medium 100 are similar to those of the wave control medium 10.

As shown in FIG. 13, the wave control medium 100 includes a coil 11 and a coil 12 which constitute a three-dimensional microstructure similarly to the wave control medium 10. Moreover, the wave control medium 100 is provided with a plurality of spheres 101 aligned in a direction in which the central axis extends at a central axis position of the spiral structure on the inner side of the coil 11. Each of the spheres 101 is disposed separated from the coil 11 by a minute interval.

Similarly to the coil 11 and the coil 12, the sphere 101 includes a material selected from any one of a metal, a dielectric, a magnetic body, a semiconductor, and a superconductor, or a combination of a plurality of these materials. In addition, the material of the sphere 101 is not necessarily the same as that of the coil 11 and the coil 12, and the materials may be different from each other. Moreover, the number of the spheres 101 is not limited, and may be any number. Note that the spheres 101 can also be disposed on the outer side of the coil 11 and the coil 12.

In the wave control medium 100, it is assumed that the electric field direction of the radio wave to be applied coincides with the vibration direction of electrons in which the spheres 101 are aligned, and the magnetic field direction of the radio wave to be applied is orthogonal to the magnetic force direction electromagnetically induced by the annular current flowing in the coil 11 and the coil 12. At this time, the sphere 101 functions to the magnetic field, and the coil 11 and the coil 12 function to the electric field. That is, the electrons vibrating along the sphere 101 function with respect to the magnetic field. In addition, the coil 11 and the coil 12 function with respect to the electric field.

According to the wave control medium 100 according to the present embodiment, in addition to the similar effects as those of the wave control medium 10 according to the first embodiment, in a case where desired physical properties are difficult to be obtained only by the spiral structure of the coil 11 and the coil 12, the relative permeability and/or the relative permittivity can be finely adjusted by performing function role-sharing by combining the structure of the sphere 101 to the spiral structure. Moreover, because the wave control medium 100 also serves as a capacitor between the sphere 101 and the coil 11, the capacitance can be increased more than that of the wave control medium 10.

11. Eleventh Embodiment (Electromagnetic Wave Absorbing Member)

Figure 14:
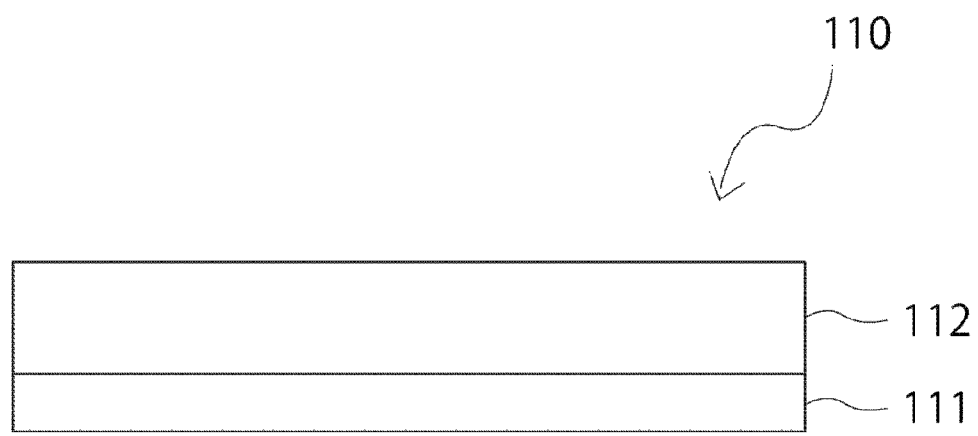
FIG. 14 is a cross-sectional view showing a configuration example of an electromagnetic wave absorbing sheet according to an eleventh embodiment of the present technology.

Next, a configuration example of an electromagnetic wave absorbing member 110 according to an eleventh embodiment of the present technology is described with reference to FIG. 14. FIG. 14 is a cross-sectional view showing a configuration example of an electromagnetic wave absorbing member 110 according to the present embodiment perpendicular to the extending direction.

As shown in FIG. 14, the electromagnetic wave absorbing member (electromagnetic wave absorbing sheet) 110 has a rectangular shape in which a cross section perpendicular to the extending direction is widened in the horizontal direction. The electromagnetic wave absorbing member 110 includes a support 111 in a lower part and a wave control medium 112 above the support 111. The support 111 includes a metal, a dielectric, or a resin.

The wave control medium 112 is a metamaterial having a resin of a wave control element in which any of the wave control media 10 to 100 described above is integrated in an array structure or a plurality of the wave control media is dispersedly disposed.

The electromagnetic wave absorbing member 110 can absorb the irradiated electromagnetic wave by controlling a refractive index in a direction in which the electromagnetic wave is absorbed by the wave control medium 112. Furthermore, the electromagnetic wave absorbing member 110 can also be used as an electromagnetic wave shielding member for shielding the irradiated electromagnetic wave by controlling a refractive index in a direction in which the electromagnetic wave is shielded by the wave control medium 112. Moreover, the electromagnetic wave absorbing member 110 can be applied to a sensor such as an electronic toll collection system (ETC) or a radar.

12. Twelfth Embodiment (Electromagnetic Waveguide)

(1) Configuration Example of Electromagnetic Waveguide 120

Figure 15:
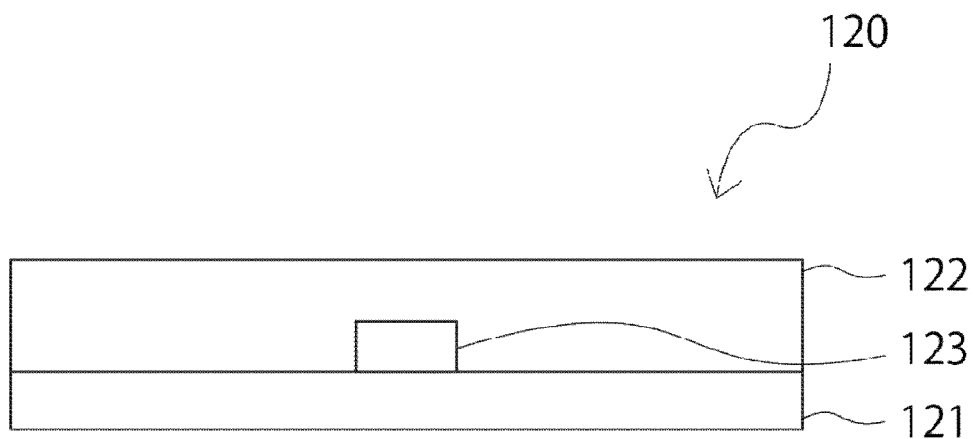
FIG. 15 is a cross-sectional view showing a configuration example of a waveguide according to a twelfth embodiment of the present technology.

Next, a configuration example of an electromagnetic waveguide 120 according to a twelfth embodiment of the present technology is described with reference to FIG. 15. FIG. 15 is a cross-sectional view showing a configuration example of an electromagnetic waveguide 120 according to the present embodiment perpendicular to the extending direction.

As shown in FIG. 15, the electromagnetic waveguide 120 has a rectangular shape in which a cross section perpendicular to the extending direction is widened in the horizontal direction. The electromagnetic waveguide 120 includes a support 121 at a lower part, and includes a medium 122 of silicon dioxide ($SiO_2$) or a dielectric at above the support 121. The support 121 includes silicon (Si), a metal, a dielectric, or a resin.

A waveguide tube 123 having a rectangular shape with a horizontally widened cross section is provided in the central part of the medium 122 at a contact position with the support 121. The waveguide tube 123 includes a metamaterial having a resin of a wave control element in which any of the wave control media 10 to 100 described above is integrated in an array structure or a plurality of the wave control media is dispersedly disposed. Note that the shapes of the electromagnetic waveguide 120 and the waveguide tube 123 are not limited to the present embodiment, and may be a cylindrical shape or the like.

With the above configuration, the electromagnetic waveguide 120 can control the refractive index of the electromagnetic wave guided to the waveguide tube 123. Furthermore, the electromagnetic waveguide 120 can be included in the arithmetic element.

(2) Modified Example of Electromagnetic Waveguide 120

Figure 16:
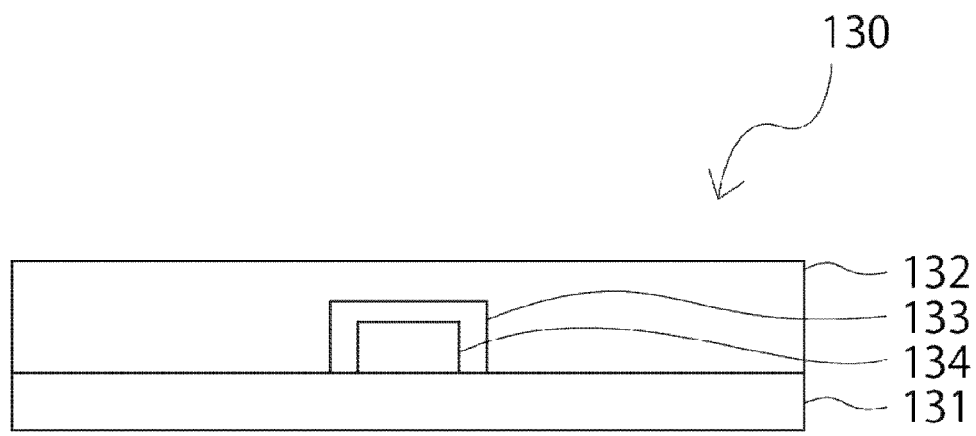
FIG. 16 is a cross-sectional view showing a modified example of the waveguide according to the twelfth embodiment of the present technology.

Next, a configuration example of the electromagnetic waveguide 120 is described with reference to FIG. 16. FIG. 16 is a cross-sectional view showing a configuration example of an electromagnetic waveguide 130, which is a modified example of the electromagnetic waveguide 120, perpendicular to the extending direction. The electromagnetic waveguide 130 is different from the electromagnetic waveguide 120 in that a layer of a material other than the wave control medium is formed in the waveguide tube. The overall shape of the electromagnetic waveguide 130 is similar to that of the electromagnetic waveguide 120.

As shown in FIG. 16, the electromagnetic waveguide 130 has a rectangular shape in which a cross section perpendicular to the extending direction is widened in the horizontal direction. The electromagnetic waveguide 130 includes a support 131 at a lower part, and includes a medium 132 of silicon dioxide ($SiO_2$) or a dielectric at above the support 131. The support 131 includes a metal, a dielectric, or a resin.

A waveguide tube 133 having a rectangular shape with a horizontally widened cross section is provided in the central part of the medium 132 at a contact position with the support 131. The waveguide tube 133 includes a metamaterial having a resin of a wave control element in which any of the wave control media 10 to 100 described above is integrated in an array structure or a plurality of the wave control media is dispersedly disposed. Moreover, a medium layer 134 including silicon (Si) or resin and having the same shape as the waveguide tube 133 is formed in the central part of the waveguide tube 133 at the contact position with the support 131.

With the above configuration, the electromagnetic waveguide 130 can control the refractive index of the electromagnetic wave guided to the waveguide tube 133.

13. Specific Bandwidth

Figure 17:
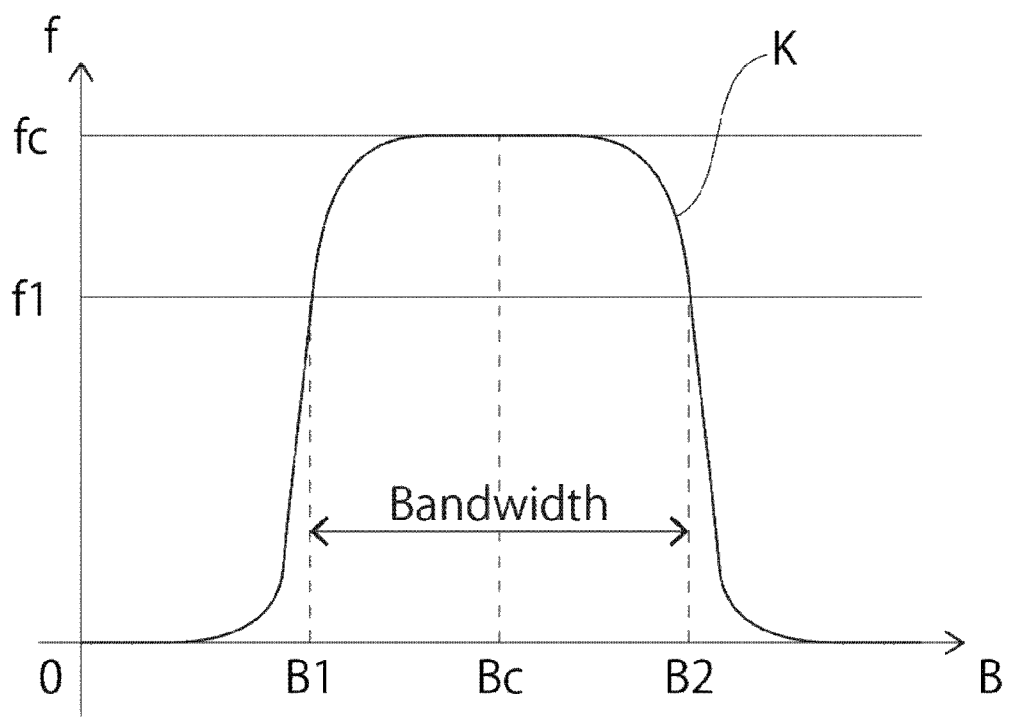
FIG. 17 is a graph for explaining a specific bandwidth of a metamaterial having a wave control medium according to the present technology.

Next, a specific bandwidth of the metamaterial having the wave control medium according to each of the above embodiments of the present technology is described with reference to FIG. 17. FIG. 17 is a graph for explaining an example of the specific bandwidth of the metamaterial having the wave control medium according to each of the above embodiments.

In the graph in FIG. 17, the vertical axis represents a frequency f, and the horizontal axis represents a frequency band B. A curve K in FIG. 17 shows a relationship between the bandwidth B and the frequency f of the metamaterial having the wave control medium according to each of the above embodiments.

The above specific bandwidth of the metamaterial is obtained from the curve K. Here, the bandwidth refers to an inter-band distance of a frequency of $2^{-1/2}$ of the peak frequency, and the specific bandwidth refers to a value obtained by dividing the bandwidth by the peak frequency that is the center frequency.

In the curve K, the frequency is a peak frequency fc in a band Bc, and is a frequency $f_1$ which is $2^{-1/2}$ of the peak frequency in the bands $B_1$ and $B_2$. Therefore, in the curve K, the bandwidth is $B_1-B_2$, and the fractional bandwidth is $(B_1-B_2)/fc$.

As described above, the wave control medium according to each of the above embodiments is optimum in a case where the specific bandwidth of a response is 30% or more, and the absorption intensity in the specific bandwidth is 50% or more. Therefore, according to the above embodiments, it is possible to provide a wave control element including the wave control medium according to each of the above embodiments and having a specific bandwidth of a response of 30% or more, and an absorption intensity in the specific bandwidth of 50% or more. Note that, in the wave control element, the above wave control medium may be integrated in an array structure, or a plurality of the wave control media may be dispersedly disposed.

14. Other Applications

Next, applications of the metamaterial having the wave control medium according to each of the above embodiments of the present technology is described.

In addition to the applications described above, the metamaterial having the wave control medium according to each of the above embodiments can be applied to a wave control device that performs signal transmission/reception or light reception/emission, a small antenna, a low-profile antenna, a frequency selection filter, an artificial magnetic conductor, an electro band gap member, a noise suppression member, an isolator, a radio wave lens, a radar member, an optical lens, an optical film, an optical element for terahertz, a radio wave and optical camouflage/invisibility member, a heat dissipation member, a heat shielding member, a heat storage member, a non-linear device for electromagnetic wave modulation/demodulation, wavelength conversion, and the like, a speaker, and the like.

Note that the present technology can have the following configurations.

(1)
A wave control medium including a three-dimensional microstructure having a base, a spiral part, and a matching element disposed between the base and the spiral part, in which the three-dimensional microstructure includes a material selected from any one of a metal, a dielectric, a magnetic body, a semiconductor, and a superconductor, or a combination of a plurality of these materials.

(2)
The wave control medium according to (1), in which the spiral part has a multilayer structure.

(3) The wave control medium according to (1) or (2), in which the spiral part has a cone shape.

(4)
The wave control medium according to any one of (1) to (3), further including at least two of the three-dimensional microstructures.

(5)
The wave control medium according to (4), in which the at least two of the three-dimensional microstructures have a continuous structure in which the structures are intertwined while facing each other without being in contact with each other.

(6)
The wave control medium according to (4) or (5), in which at least one of the three-dimensional microstructures has any one of a wire shape, a plate shape, and a sphere shape.

(7)
A wave control element in which the wave control medium according to any one of (1) to (6) is integrated in an array structure.

(8)
A wave control element in which the wave control medium according to any one of (1) to (6) is dispersedly disposed in plural numbers.

(9)
A wave control element including the wave control medium according to any one of (1) to (6), in which the wave control element has a specific bandwidth of a response of 30% or more, and an absorption intensity in the specific bandwidth of 50% or more.

(10)
A wave control member including the wave control medium according to any one of (1) to (6).

(11)
A wave control device including a metamaterial having the wave control medium according to any one of (1) to (6).

(12)
A wave control device including an electromagnetic absorbing and/or shielding member having the wave control medium according to any one of (1) to (6).

(13)
A wave control device including a sensor having an electromagnetic absorbing and/or shielding member having the wave control medium according to any one of (1) to (6).

(14)
A wave control device that performs signal transmission/reception or light reception/emission using the wave control medium according to any one of (1) to (6).

(15)
A manufacturing method of a wave control medium, the manufacturing method including forming a microstructure into a three-dimensional structure using a molecular template that utilizes self-assembly of an organic substance, the microstructure including a material selected from any one of a metal, a dielectric, a magnetic body, a semiconductor, and a superconductor, or a combination of a plurality of these materials.

REFERENCE SIGNS LIST 1, 5, 7 Wave control medium
2 Base
3, 8, 9 Spiral part
4, 6 Matching element
20, 30, 40, 50, 60, 70, 80, 90, 100 Three-dimensional structure
11, 12, 21, 22, 31, 32, 41, 42 Coil
51, 61, 71 Wire
81, 91 Plate
101 Sphere
110 Electromagnetic wave absorbing sheet
111, 121, 131 Support
112 Wave control medium
120, 130 Electromagnetic waveguide
122, 132 Medium 123, 133 Waveguide tube
134 Medium layer

The invention claimed is:

1. A wave control medium comprising a three-dimensional microstructure having a base, a spiral part, and a matching element disposed between the base and the spiral part, wherein
the three-dimensional microstructure includes a material selected from any one of a metal, a dielectric, a magnetic body, a semiconductor, and a superconductor, or a combination of a plurality of the metal, the dielectric, the magnetic body, the semiconductor, and the superconductor.

2. The wave control medium according to claim 1, wherein the spiral part has a multilayer structure.

3. The wave control medium according to claim 1, wherein the spiral part has a cone shape.

4. The wave control medium according to claim 1, further comprising at least two of the three-dimensional microstructures.

5. The wave control medium according to claim 4, wherein the at least two of the three-dimensional microstructures have a continuous structure in which the structures are intertwined while facing each other without being in contact with each other.

6. The wave control medium according to claim 4, wherein at least one of the three-dimensional microstructures has any one of a wire shape, a plate shape, and a sphere shape.

7. A wave control element wherein the wave control medium according to claim 1 is integrated in an array structure.

8. A wave control element wherein the wave control medium according to claim 1 is dispersedly disposed in plural numbers.

9. A wave control element comprising the wave control medium according to claim 1, wherein the wave control element has a specific bandwidth of a response of 30% or more, and an absorption intensity in the specific bandwidth of 50% or more.

10. A wave control member comprising the wave control medium according to claim 1.

11. A wave control device comprising a metamaterial having the wave control medium according to claim 1.

12. A wave control device comprising an electromagnetic absorbing and/or shielding member having the wave control medium according to claim 1.

13. A wave control device comprising a sensor having an electromagnetic absorbing and/or shielding member having the wave control medium according to claim 1.

14. A wave control device that performs signal transmission/reception or light reception/emission using the wave control medium according to claim 1.

15. A manufacturing method of a wave control medium, the manufacturing method comprising forming a microstructure into a three-dimensional structure using a molecular template that utilizes self-assembly of an organic substance, the microstructure including a material selected from any one of a metal, a dielectric, a magnetic body, a semiconductor, and a superconductor, or a combination of a plurality of the metal, the dielectric, the magnetic body, the semiconductor, and the superconductor, wherein the three-dimensional microstructure having a base, a spiral part, and a matching element disposed between the base and the spiral part.

* * * * *